(12) United States Patent
Roe et al.

(10) Patent No.: US 8,949,246 B2
(45) Date of Patent: Feb. 3, 2015

(54) SYSTEM AND METHOD FOR IMPORTING NETCDF DATA

(71) Applicants: Marvin W. Roe, Slidell, LA (US); Brian S Bourgeois, Slidell, LA (US)

(72) Inventors: Marvin W. Roe, Slidell, LA (US); Brian S Bourgeois, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 144 days.

(21) Appl. No.: 13/707,935

(22) Filed: Dec. 7, 2012

(65) Prior Publication Data

US 2013/0173631 A1    Jul. 4, 2013

Related U.S. Application Data

(60) Provisional application No. 61/582,381, filed on Jan. 1, 2012.

(51) Int. Cl.
  *G06F 17/30* (2006.01)
  *G09B 29/00* (2006.01)

(52) U.S. Cl.
  CPC .... *G06F 17/30241* (2013.01); *G06F 17/30321* (2013.01); *G09B 29/007* (2013.01); *G09B 29/003* (2013.01)
  USPC ........... 707/741; 707/756; 707/802; 715/848; 715/859

(58) Field of Classification Search
  CPC .................. G06F 17/30241; G06F 17/30321; G06F 21/60; G06F 17/30; G06F 19/18; G06F 19/24; G06F 19/345; G09B 29/007; G09B 29/003
  USPC ................. 715/850, 848, 859; 345/660, 440, 345/440.1, 440.2; 707/741, 756, 802, 707/821.724, 726, E17.044, E17.02
  See application file for complete search history.

(56) References Cited

U.S. PATENT DOCUMENTS

| 6,993,529 | B1 |    | 1/2006  | Basko et al.     |        |
|-----------|----|----|---------|------------------|--------|
| 8,209,124 | B2 | *  | 6/2012  | Dannevik et al.  | 702/3  |
| 8,760,966 | B2 | *  | 6/2014  | Laake et al.     | 367/38 |
| 2008/0016023 | A1 |  | 1/2008  | Aspinall         |        |
| 2008/0016108 | A1 | * | 1/2008  | Aspinall         | 707/102 |
| 2008/0056538 | A1 | * | 3/2008  | Frank            | 382/113 |
| 2010/0020066 | A1 | * | 1/2010  | Dammann          | 345/419 |
| 2010/0332192 | A1 |  | 12/2010 | Lin et al.       |        |
| 2012/0004854 | A1 | * | 1/2012  | Fernandez et al. | 702/19 |
| 2012/0194558 | A1 | * | 8/2012  | Dykes et al.     | 345/660 |

OTHER PUBLICATIONS

Rouse, Z.T. ; Geocent, Metairie, LA, USA ; Haynie, J.B. ; Davis, C.—"Anti-Submarine Warfare visual analysis tool geospatially enabling Four Dimensional METOC data" Published in: OCEANS 2009, MTS/IEEE Biloxi—Marine Technology for Our Future: Global and Local Challenges Date of Conference: Oct. 26-29, 2009 pp. 1-5.*

(Continued)

*Primary Examiner* — Anh Ly
(74) *Attorney, Agent, or Firm* — US Naval Research Laboratory; Kathleen Chapman

(57) ABSTRACT

System and method for providing an automated method of importing NetCDF formatted data from a variety of sources that contain a variety of internal datasets. Options for processing and analysis can be provided and can occur simultaneously as the data are being processed. Storage and organization options provide efficient viewing and analysis of NetCDF datasets.

20 Claims, 10 Drawing Sheets

(56) References Cited

OTHER PUBLICATIONS

"Differences among the data models used by the geographic information systems and atmospheric science communities" by Stefano Nativi et al. Nov. 3, 2003—Proceedings American Meteorological Society—20th Interactive Image Processing Systems Conference pp. 1-20.*

Roe, M.W., and Bourgeois, B.S., (2011) Mission Management for Unmanned Underwater Vehicles, Naval Research Laboratory, Stennis Space Center, Power Point publication, Feb. 24, 2011.

U.S. Provisional application filed Jan. 1, 2012, U.S. Appl. No. 61/582,381; System and method for importing NETCDF data, Marvin Roe, et al.

PCT application filed Dec. 17, 2012, application No. PCT/US12/70001; System and method for importing NETCDF data, Marvin Roe, et al.

Roe, Marvin and Bourgeois, Brain, Mission Management for Unmanned Underwater Vehicles, Underwater Intervention Conference 2011, (UI2011) vol. 2 of 2, New Orleans, Louisiana, Feb. 22-24, 2011.

Kim, J., et al., Web-based Information System for Ocean/Coastal Environmental Data Service, Journal of KISS: Computing Practices, vol. 17, No. 12. Dec. 2011, ISSN 1229-7712, pp. 630-639.

Brown, M., Converting Grids and Motion Vectors to Google Earth Format, using Panoply, [Online]Jun. 2011, http://marinedataliteracy.org/ops/pano_gridsvecs.htm.

* cited by examiner

SYSTEM AND METHOD FOR IMPORTING NETCDF DATA

CROSS-REFERENCE TO RELATED APPLICATIONS

This application is a non-provisional application claiming priority to provisional application 61/582,381 filed on Jan. 1, 2012, under 35 USC 119(e). The entire disclosure of the provisional application is incorporated herein by reference.

BACKGROUND

Methods and systems disclosed herein relate generally to accessing and importing data, and more particularly to accessing Network Common Data Format (NetCDF) datasets and importing those datasets into geospatial map displays.

NetCDF is an Application Programming Interface (API) that is used to manage array-based scientific data in a machine-independent format. A variety of data types are typically stored in NetCDF files such as single-point observations, time series, regular-spaced grids, and satellite or radar images. The API is intended to provide a common data access method for all applications that generate and/or make use of NetCDF data.

Oceanographers plan and monitor the use of underwater gliders to collect environmental data and use numerical model forecasts stored in NetCDF files to study the effects of environmental forces on glider missions. The datasets provided within a numerical model forecast range from two-dimensional scalar to four-dimensional vector information. Physical aspects provided in these datasets that affect vehicle mission planning and monitoring include temperature, salinity and current magnitude and direction. Being able to import these datasets into a Geospatial Information System (GIS) for analysis is crucial to safe and successful operation of these vehicles.

Currently, users load datasets one file at a time, one layer at a time for every time slice. Each of the data layers then need to be custom clipped if a subset is all that is needed. Custom calculations have to be made manually. Further, the data display is disorganized and crowds the root level of the table of contents hindering the navigation of those data layers for viewing and analysis. Also any tool tip information is limited to a single attribute field within the dataset. Finally, if the data are viewed again later, the entire process has to be repeated.

Accordingly, there is a need for a method and system that provide (1) automatic extraction of each two-dimensional slice of data for each depth for every time interval, (2) subset area determination when needed, (3) automatic organization of the information into a manageable tree structure as in many cases there can be over 1000 layers that could possibly be imported per dataset, and (4) automatic calculation of a time depth average for all of the imported layers.

SUMMARY

The system and method of the present embodiment for providing improved import, organization and analysis functionality for multi-dimensional datasets stored in NetCDF from within a Geospatial Information System (GIS). The graphical user interface (GUI) can be, for example, but not limited to, a compatible plug in tool for use in GIS systems provided by the Environmental Systems Research Institute (ESRI).

The system and method of the present embodiment overcome existing limitations by automatically handling multiple file structures and internal formats of NetCDF files. The system and method automatically detect internal file formats and extract metadata and data ranges within the file(s). Thus, file contents can be verified prior to processing and storage of extracted data. A subset of the data can be chosen to limit processing to the data most pertinent to a particular project.

The method for populating a map in a geospatial environment from NetCDF data can include, but is not limited to including, the steps of automatically determining characteristics of the NetCDF data, automatically displaying the characteristics for interactive modification of the characteristics, automatically distinguishing the NetCDF data that are scalar values from the NetCDF data that are vector values, automatically creating an index map in computer memory, automatically extracting a subset of the NetCDF data based on the modified characteristics and the index map, the subset being extracted in three or four dimensions, depending on whether the NetCDF data are scalar values or vector values, respectively, automatically providing the extracted subset to the geospatial environment to create the map, and automatically manipulating a table of contents in the geospatial environment to reference the extracted subset directly. The NetCDF data can include a plurality of files.

Optionally, the method can include the steps of automatically determining the extent of the NetCDF data, and automatically determining the resolution of the NetCDF data. Further optionally, the method can include the step of automatically performing time-depth averaging on the extracted subset, automatically exporting the extracted subset to a KML format, and automatically storing the extracted subset on a computer-readable medium. The four dimensions comprise u and v components of the vector values, depth, and time, and the three dimensions comprise the scalar value, depth, and time. The method can optionally include the steps of requesting from the geospatial environment the u and v components associated with each of the depths at each of the times, and calculating a magnitude and a direction of the vector values based on the u and v components. The method can further optionally include the steps of automatically creating two-dimensional arrays, automatically computing time-depth averages over the extracted subset, storing intermediate values of the time-depth averages in the two-dimensional arrays. The method step of manipulating can include, but is not limited to including, the steps of identifying the extracted subset as a string representative of a hierarchy, and storing the string in the table of contents according to the hierarchy.

The method of the present embodiment for accessing NetCDF-formatted datasets and importing the datasets into a geospatial map can include, but is not limited to including, the steps of receiving a file structure and an identifier for the NetCDF-formatted dataset, automatically detecting an internal format of a file from the NetCDF-formatted dataset identified by the identifier based on the file structure, automatically extracting metadata and data ranges from the file based on the internal format, automatically enabling verification of NetCDF data in the file based on the metadata and the data ranges, receiving subset information and customization information and simultaneously automatically extracting the NetCDF data from the file based on the subset information and the customization information, automatically calculating a time depth average for all layers in the extracted NetCDF data, and automatically storing the extracted NetCDF data and the average in Keyhole Markup Language (KML) files on a computer-readable medium.

The method can further optionally include the steps of automatically detecting if the file includes multiple time slices or a single time slice, automatically detecting in the file includes scalar or vector data, automatically detecting dimensionality of the NetCDF data, automatically detecting a security classification of the NetCDF data, automatically displaying an outline of the extent of the dataset on the map, automatically creating and storing on the computer-readable medium an electronic table of contents for electronic navigation of the NetCDF dataset, automatically storing on the computer-readable medium the extracted NetCDF data in an electronic geodatabase, automatically overriding, based on the metadata, an ESRI limitation to a single attribute for mouse-over tooltip generation, automatically organizes the extracted data to support custom animation on the map, enabling automatic modification of the extracted data, and storing on the computer-readable medium a geospatial/relational database schema and database manager API to manage the metadata, the layers, and the time depth average.

A computer system for populating a map in a geospatial environment from NetCDF data can include, but is not limited to including, a characteristics processor automatically determining characteristics of the NetCDF data, a display processor automatically displaying the characteristics for interactive modification of the characteristics, a scalar/vector processor automatically distinguishing the NetCDF data that are scalar values from the NetCDF data that are vector values, an index map processor automatically creating an index map in computer memory, a data extractor automatically extracting a subset of the NetCDF data based on the modified characteristics and the index map, the subset being extracted in three or four dimensions, depending on whether the NetCDF data are scalar values or vector values, respectively, the data extractor automatically providing the extracted subset to the geospatial environment to create the map, and a table-of-contents processor automatically manipulating a table of contents in the geospatial environment to reference the extracted subset directly. The characteristics processor can optionally automatically determine the extent of the NetCDF data, and automatically determines the resolution of the NetCDF data. The data extractor can optionally automatically perform time-depth averaging on the extracted subset, can automatically export the extracted subset to a KML format, can request from the geospatial environment the u and v components associated with each of the depths at each of the times, and calculates a magnitude and a direction of the vector values based on the u and v components, and can automatically create two-dimensional arrays, and automatically computes time-depth averages over the extracted subset, storing intermediate values of the time-depth averages in the two-dimensional arrays. The table-of-contents processor identifies the extracted subset as a string representative of a hierarchy, and stores the string in the table of contents according to the hierarchy.

A computer system for accessing NetCDF-formatted datasets and importing the datasets into a geospatial map can include, but is not limited to including, a format processor receiving a file structure and an identifier for the NetCDF-formatted dataset, the format processor automatically detecting an internal format of a file from the NetCDF-formatted dataset identified by the identifier, the identifier based on a file structure, a metadata/data range extractor automatically extracting metadata and data ranges from the file based on the internal format, a verification processor automatically enabling verification of NetCDF data in the file based on the metadata, the data ranges, and verification information, the verification processor producing verified data, a subset/customization processor receiving subset information and customization information, the subset/customization processor simultaneously automatically extracting the NetCDF data from the file based on the subset information and the customization information, the subset/customization processor calculating subsetted/customized data in layers, a time depth average processor automatically calculating a time depth average for all the layers in the extracted NetCDF data, and a storage processor automatically storing formatted subsetted/customized data in the layers, the storage processor automatically storing an average in Keyhole Markup Language (KML) files on a computer-readable medium. The format processor can include computer code stored on a computer readable medium for automatically detecting if the file includes multiple time slices or a single time slice, automatically detecting if the file includes scalar or vector data, automatically detecting dimensionality of the NetCDF data, and automatically detecting a security classification of the NetCDF data. The storage processor can include computer code stored on a computer readable medium for automatically displaying an outline of the extent of the dataset on the map, automatically creating and storing on the computer-readable medium an electronic table of contents for electronic navigation of the NetCDF dataset, and automatically storing on the computer-readable medium the extracted NetCDF data in an electronic geodatabase. The metadata/data range extractor processor can include, but is not limited to including, computer code stored on a computer readable medium for automatically overriding, based on the metadata, ESRI limitation to a single attribute for mouse-over too generation. The storage processor can optionally include computer code stored on a computer readable medium for automatically organizing the extracted data to support custom animation on the map, enabling automatic modification of the extracted data, storing a geospatial/relational database schema and database manager API to manage the metadata, the layers, and the time depth average, automatically organizing 4D data for traversal and review on the map display, automatically creating a result dataset including calibration adjustments for source data by adding or subtracting a known amount across the entire field of data, and automatically making the result dataset available and viewable within the map display.

These and other aspects and features of the present teachings will become apparent from the following detailed description of the exemplary embodiments, read in conjunction with, and with reference to, the accompanying drawings.

BRIEF DESCRIPTION OF THE DRAWINGS

Referring now to the drawings, in which like numerals represent like elements, aspects of the exemplary embodiments will be described in connection with the drawing set.

DETAILED DESCRIPTION

The problems set forth above as well as further and other problems are solved by the present teachings. These solutions and other advantages are achieved by the various embodiments of the teachings described herein below.

Figure 1:
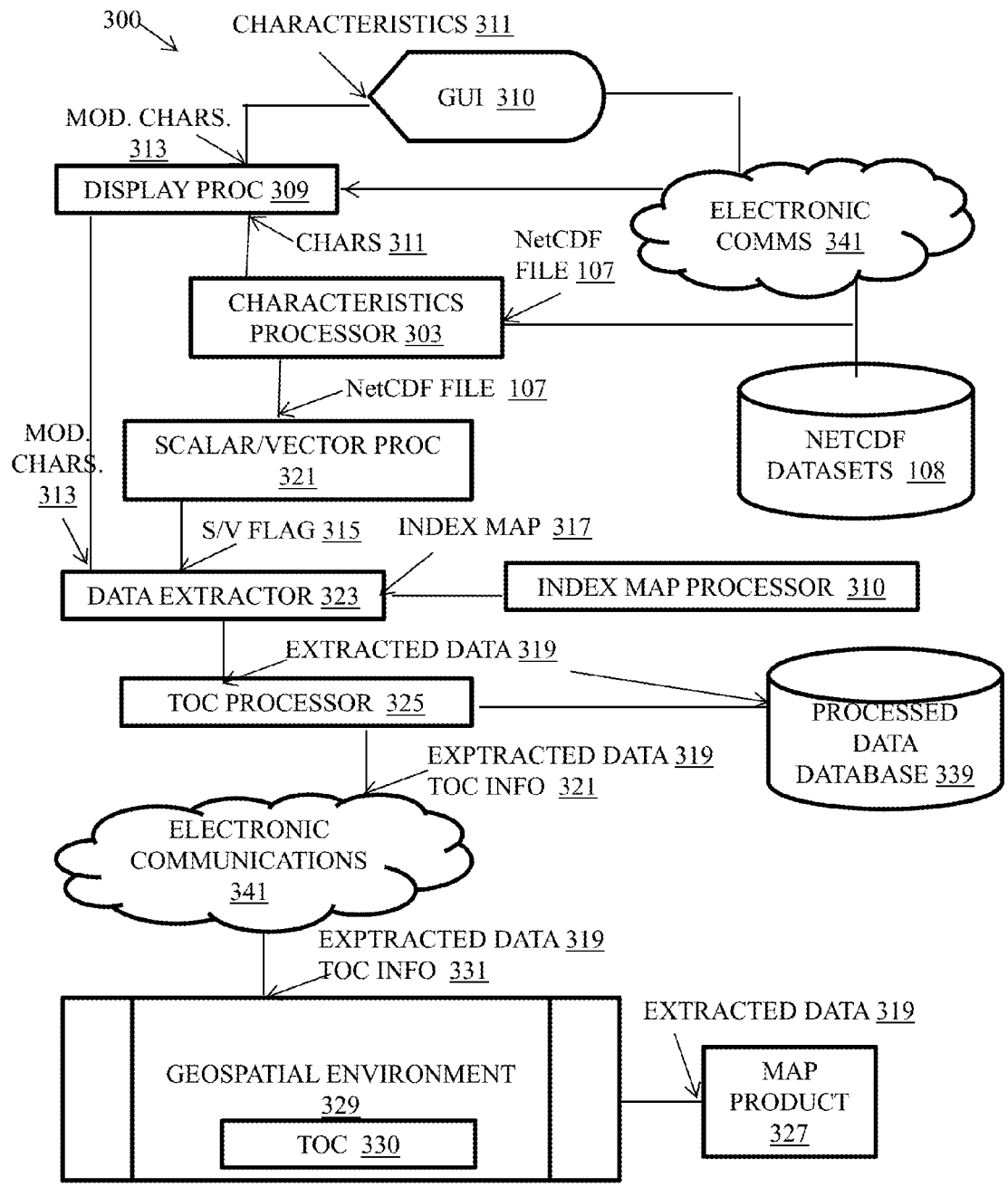
FIG. 1 is a schematic block diagram of one embodiment of the system of the present embodiment.

Referring now to FIG. 1, system 300 for populating a map in a geospatial environment from NetCDF data can include, but is not limited to including, characteristics processor 303 automatically determining characteristics 311 of the NetCDF data 107, display processor 309 automatically displaying characteristics 311 for interactive modification of characteristics 311, and scalar/vector processor 321 automatically distinguishing NetCDF data 107 that are scalar values from NetCDF data 107 that are vector values and setting S/V flag 315 accordingly. Characteristics processor 303 can automatically determine the extent of NetCDF data 107, and can automatically determine the resolution of NetCDF data 107. System 300 can further include index map processor 310 automatically creating index map 317 in computer memory, data extractor 323 automatically extracting a subset of NetCDF data 107 based on modified characteristics 313 and index map 317, the subset being extracted in three or four dimensions, depending on the value of S/V flag 315, i.e. whether the NetCDF data are scalar values or vector values, respectively. The four dimensions can include u and v components of the vector values, depth, and time. The three dimensions can include a scalar value, depth, and time. Data extractor 323 can automatically provide extracted subset 319 to geospatial environment 329 to create map 327. System 300 can still further include table-of-contents processor 325 automatically manipulating table of contents 330 in geospatial environment 329 by creating TOC info 331 to reference extracted subset 319 directly. NetCDF data 107 can include a plurality of files. Data extractor 323 can automatically perform time-depth averaging on the extracted subset, export extracted subset 319 to a KML format, request from the geospatial environment the u and v components associated with each of the depths at each of the times, calculate a magnitude and a direction of the vector values based on the u and v components, create two-dimensional arrays, and automatically compute time-depth averages over the extracted subset, storing intermediate values of the time-depth averages in the two-dimensional arrays. Table-of-contents processor 325 can identify extracted subset 319 as a string representative of a hierarchy, and can store the string in table of contents 330 according to the hierarchy.

Figure 2:
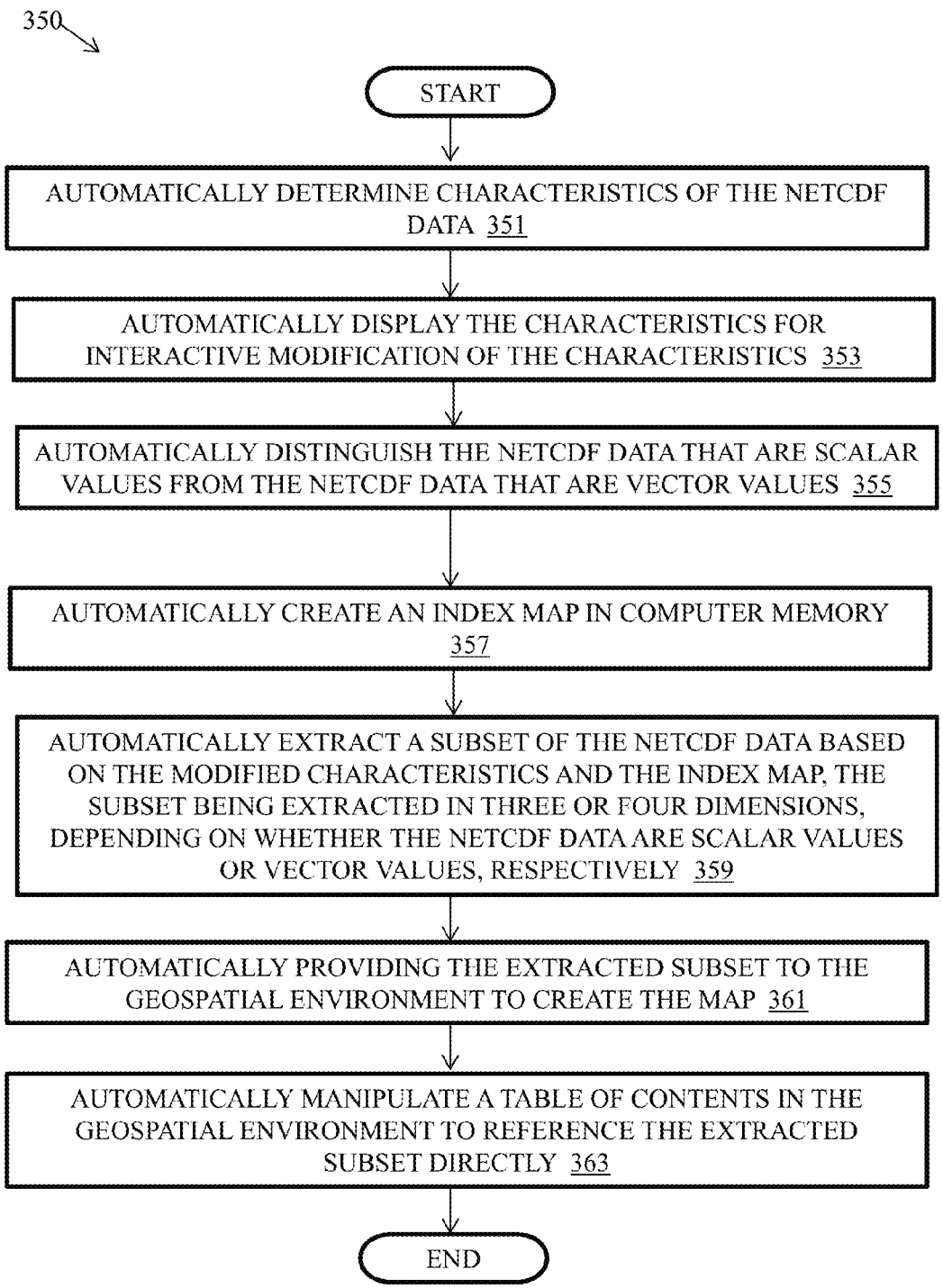
FIG. 2 is a flowchart of one embodiment of the method of the present embodiment.

Referring now primarily to FIG. 2, method 350 for populating map 327 (FIG. 1) in geospatial environment 329 (FIG. 1) from NetCDF data 107 (FIG. 1), which can optionally include a plurality of files, can include, but is not limited to including, the steps of automatically determining 351 characteristics 303 (FIG. 1) of NetCDF data 107 (FIG. 1), automatically displaying 353 characteristics 311 (FIG. 1) for interactive modification of characteristics 311 (FIG. 1), automatically distinguishing 355 NetCDF data 107 (FIG. 1) that are scalar values from NetCDF data 107 (FIG. 1) that are vector values, automatically creating 357 index map 317 (FIG. 1) in computer memory, automatically extracting 359 a subset of NetCDF data 107 (FIG. 1) based on modified characteristics 313 (FIG. 1) and index map 317 (FIG. 1), the subset 319 (FIG. 1) being extracted in three or four dimensions, depending on whether NetCDF data 107 (FIG. 1) are scalar values or vector values, respectively. The four dimensions can include, but are not limited to including u and v components of the vector values, depth, and time. The three dimensions can include, but are not limited to including a scalar value, depth, and time. Method 350 can further include the steps of automatically providing 361 extracted subset 319 (FIG. 1) to geospatial environment 329 (FIG. 1) to create map 327 (FIG. 1), and automatically manipulating 363 table of contents 330 (FIG. 1) in geospatial environment 329 (FIG. 1) to reference extracted subset 319 (FIG. 1) directly. Method 350 can optionally include the steps of automatically determining the extent of NetCDF data 107 (FIG. 1) and automatically determining the resolution of NetCDF data 107 (FIG. 1). Method 350 can further optionally include the steps of automatically performing time-depth averaging on extracted subset 319 (FIG. 1), automatically exporting extracted subset 319 (FIG. 1) to a KML format, automatically storing extracted subset 319 (FIG. 1) on a computer-readable medium, requesting from geospatial environment 329 (FIG. 1) the u and v components associated with each of the depths at each of the times, calculating a magnitude and a direction of the vector values based on the u and v components, automatically creating two-dimensional arrays, and automatically computing time-depth averages over extracted subset 319 (FIG. 1), storing intermediate values of the time-depth averages in the two-dimensional arrays. The step of manipulating can include, but is not limited to including, the steps of identifying extracted subset 319 (FIG. 1) as a string representative of a hierarchy, and storing the string in table of contents 330 according to the hierarchy.

Figure 3A:
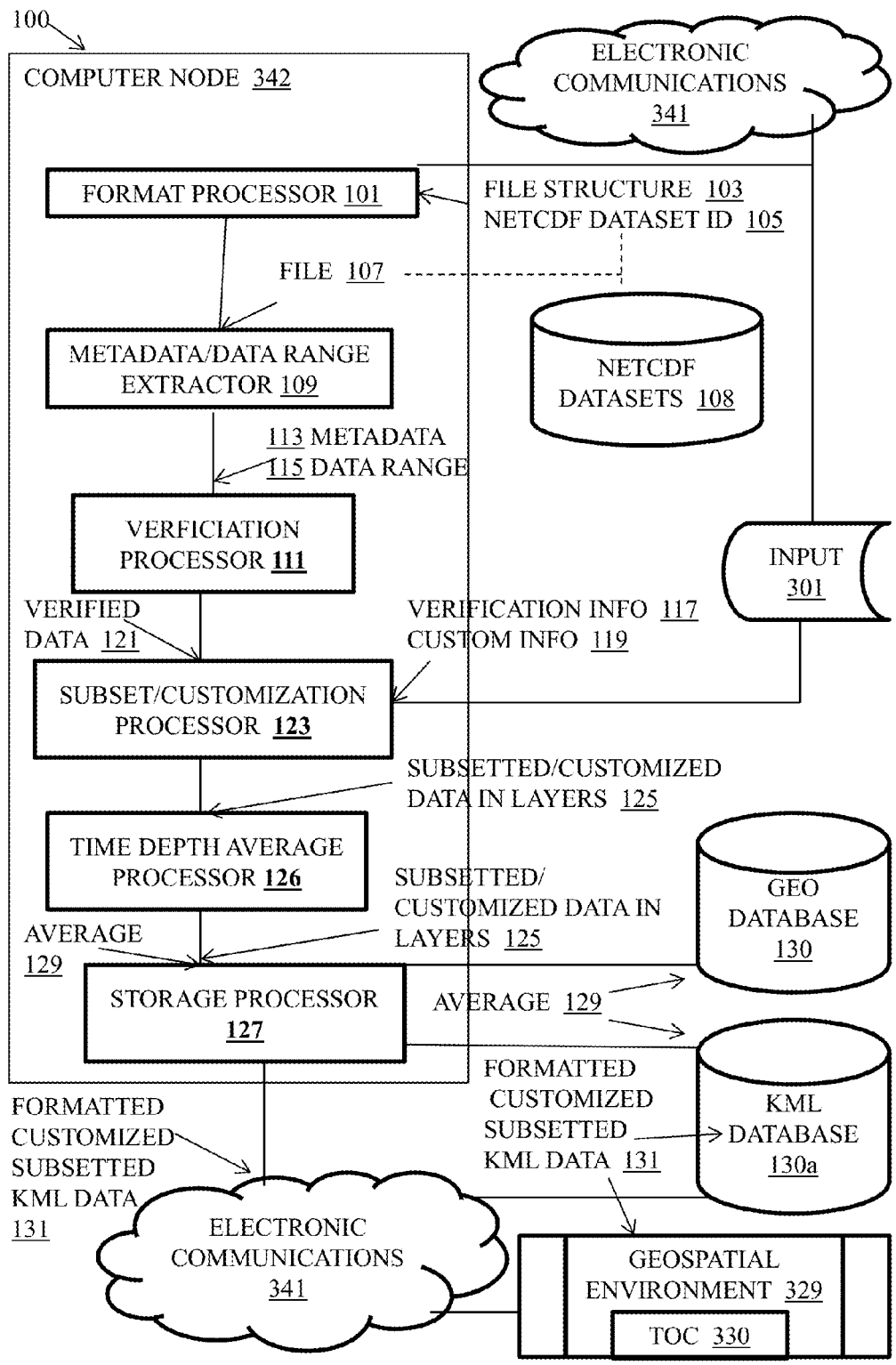
FIG. 3A is a schematic block diagram of an other embodiment of the system of the present embodiment.

Referring now to FIG. 3A, system 100 for accessing NetCDF-formatted datasets and importing the datasets into a geospatial map can include, but is not limited to including, format processor 101 receiving, for example, but not limited to, from input 301 through electronic communications 341, file structure 103 and identifier 105 for the NetCDF-formatted dataset and automatically detecting an internal format of file 107 from NetCDF-formatted dataset 108 identified by identifier 105 based on file structure 103 and metadata/data range extractor 109 automatically extracting metadata 113 and data ranges 115 from file 107 based on the internal format. System 100 can automatically organize the data ranges 115 and file structures 103 into an indexed memory map to allow programmatically traversing the entire 4D dataset during processing as needed. System 100 can also include verification processor 111 automatically enabling verification of NetCDF data in file 107 based on metadata 113, data ranges 115, and verification info 117 producing verified data 121, and subset/customization processor 123 receiving subset information and customization information 119 and simultaneously automatically extracting NetCDF data from file 107 based on subset information and the customization information 119, and calculating subsetted/customized data in layers 125. Subset customization processor 123 can automatically create a result dataset that represents calibration adjustments for source data by adding or subtracting a known amount across the entire field of data. Mapping manager 127b (FIG. 3B) can automatically make the resultant datasets available and viewable within the map display. System 100 can also include time depth average processor 126 automatically calculating time depth average 129 for all layers 125 in the extracted NetCDF data, and storage processor 127 automatically storing formatted subsetted/customized data in layers 125 and average 129 in, for example, but not limited to, Keyhole Markup Language (KML) files 131 on computer-readable media. Format processor 101 can automatically detect if file 107 includes multiple time slices or a single time slice, can automatically detect if file 107 includes scalar or vector data, can automatically detect dimensionality of the NetCDF data in file 107, and can automatically detect a security classification of the NetCDF data in file 107. Metadata/data range extractor 109 can automatically override, based on the metadata 113, a geospatial environment 329 limitation to a single attribute for mouse-over tooltip generation.

Figure 3B:
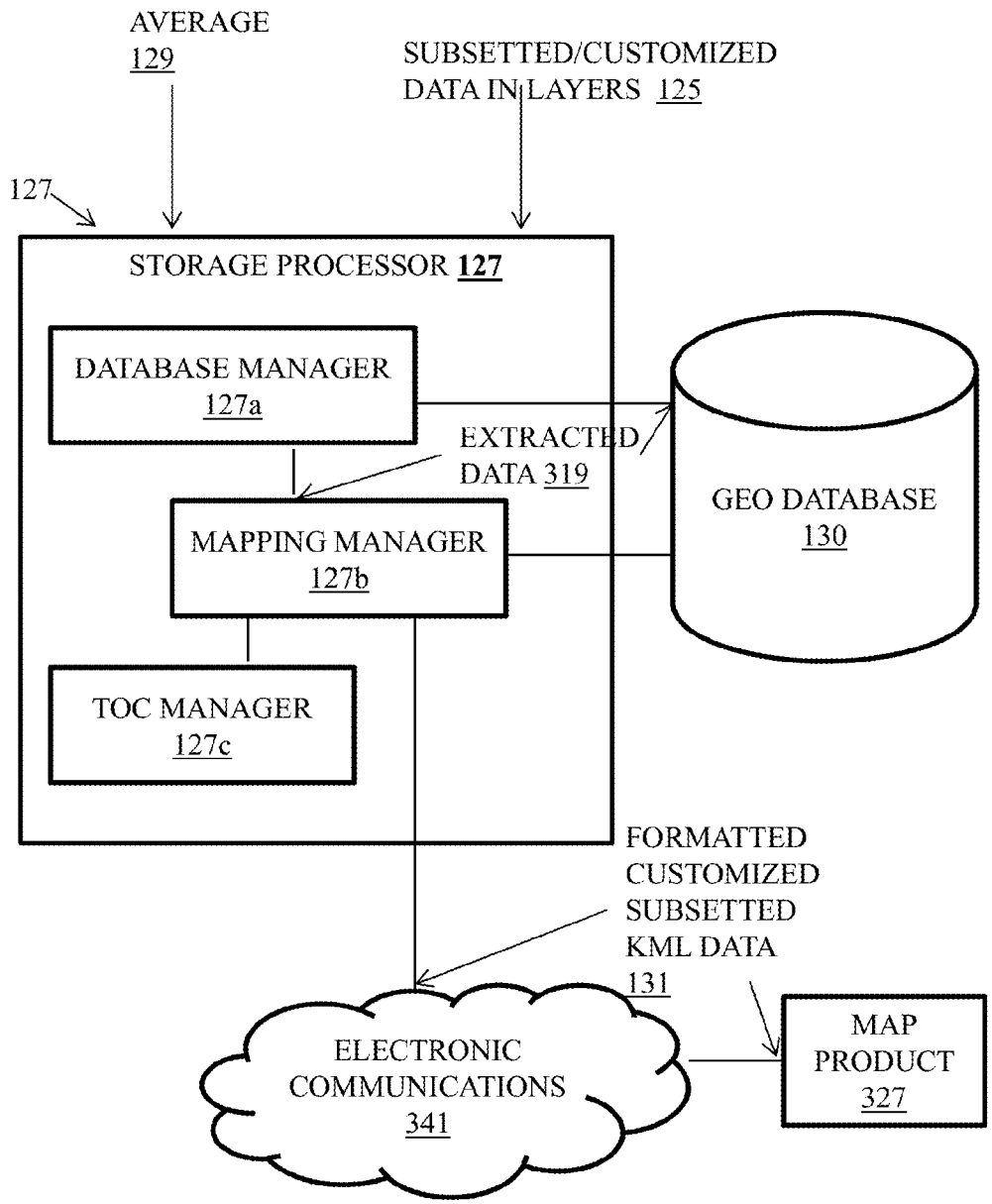
FIG. 3B is a schematic block diagram of the storage process of the embodiment of FIG. 3A.

Referring now to primarily FIG. 3B, mapping manager 127*b* can automatically display an outline of the extent of the NetCDF data on the map, and TOC manager 127*c* can automatically create and store on the computer-readable media an electronic table of contents 330 (FIG. 3A) for electronic navigation of the NetCDF data. Database manager 127*a* can automatically store on the computer-readable media the extracted NetCDF data 319 in an electronic geodatabase 130. TOC manager 127*c* can automatically organize the extracted data 319 to support custom animation on the map 327, and can enable automatic modification of the extracted data 319. Database manager 127*a* can store on the computer-readable media a geospatial/relational database schema and a database manager API to manage the metadata, the layers, and the time depth average.

Figure 4:
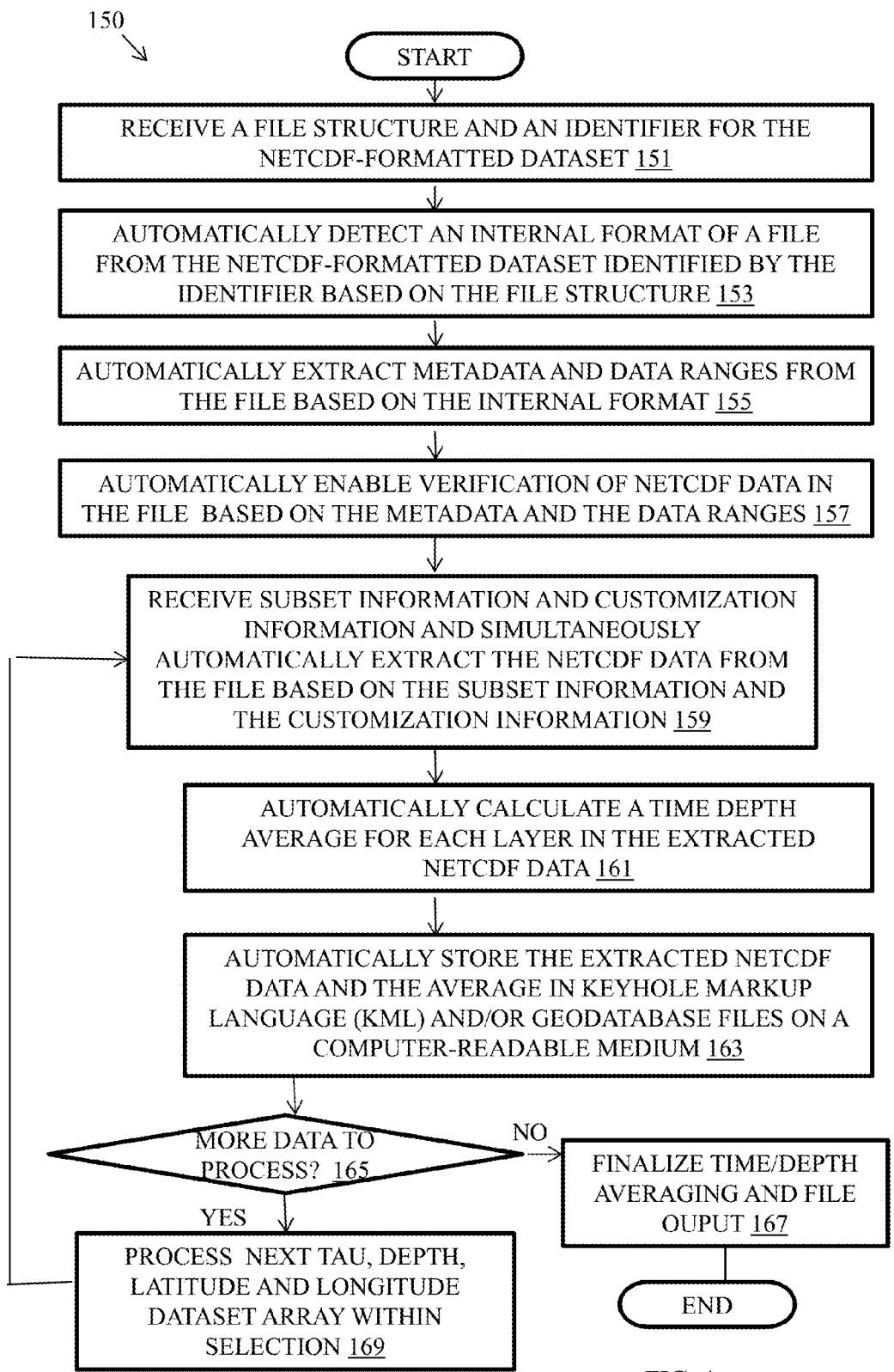
FIG. 4 is a flowchart of another embodiment of the method of the present embodiment.

Referring now primarily to FIG. 4, method 150 for accessing NetCDF-formatted datasets 108 (FIG. 3A) and importing the datasets 108 (FIG. 3A) into a geospatial map 327 (FIG. 3B) can include, but is not limited to including, the steps of receiving 151 a file structure 103 (FIG. 3A) and an identifier 105 (FIG. 3A) for the NetCDF-formatted dataset, automatically detecting 153 an internal format of a file from the NetCDF-formatted dataset identified by the identifier 105 (FIG. 3A) based on the file structure 103 (FIG. 3A), automatically extracting 155 metadata 113 (FIG. 3A) and data ranges 115 (FIG. 3A) from the file 107 (FIG. 3A) based on the internal format, automatically enabling 157 verification of NetCDF data in the file 107 (FIG. 3A) based on the metadata 113 (FIG. 3A) and the data ranges 115 (FIG. 3A), receiving 159 subset/verification information 117 (FIG. 3A) and customization information 119 (FIG. 3A) and simultaneously automatically extracting the NetCDF data from the file 107 (FIG. 3A) based on the subset/verification information 117 (FIG. 3A) and the customization information 119 (FIG. 3A), automatically calculating 161 a time depth average 129 (FIG. 3A) for all layers in the extracted NetCDF data 319 (FIG. 3B), and automatically storing 163 the extracted NetCDF data 125 (FIG. 3A) and the average 129 (FIG. 3A) in Keyhole Markup Language (KML) files 130*a* (FIG. 3A) on a computer-readable medium. If 165 there are more data to process, method 150 can include the step of processing 169 the next time, depth, latitude, and longitude dataset array within the selection. If 165 there are no more data to process, method 150 can include the step of finalizing 167 the time/depth averaging and file output.

Method 150 can optionally include the steps of automatically detecting if the file 107 (FIG. 3A) includes multiple time slices or a single time slice, automatically detecting if the file 107 (FIG. 3A) includes scalar or vector data, automatically detecting dimensionality of the NetCDF data, automatically detecting a security classification of the NetCDF data, automatically displaying an outline of the extent of the dataset on the map, automatically creating and storing on the computer-readable medium an electronic table of contents 330 (FIG. 3A) for electronic navigation of the NetCDF dataset, automatically storing on the computer-readable medium the extracted. NetCDF data 319 (FIG. 3B) in an electronic geodatabase 130 (FIG. 3B), automatically overriding, based on the metadata 113 (FIG. 3A), a geospatial environment 329 (FIG. 3A) limitation to a single attribute for mouse-over tooltip generation, automatically organizing the extracted data 319 (FIG. 3B) to support custom animation on the map 327 (FIG. 3B), enabling automatic modification of the extracted data 319 (FIG. 3B), and storing on the computer-readable medium a geospatial/relational database schema and database manager API to manage the metadata 113 (FIG. 3A), the layers 125 (FIG. 3A), and the time depth average 129 (FIG. 3A).

Figure 5:
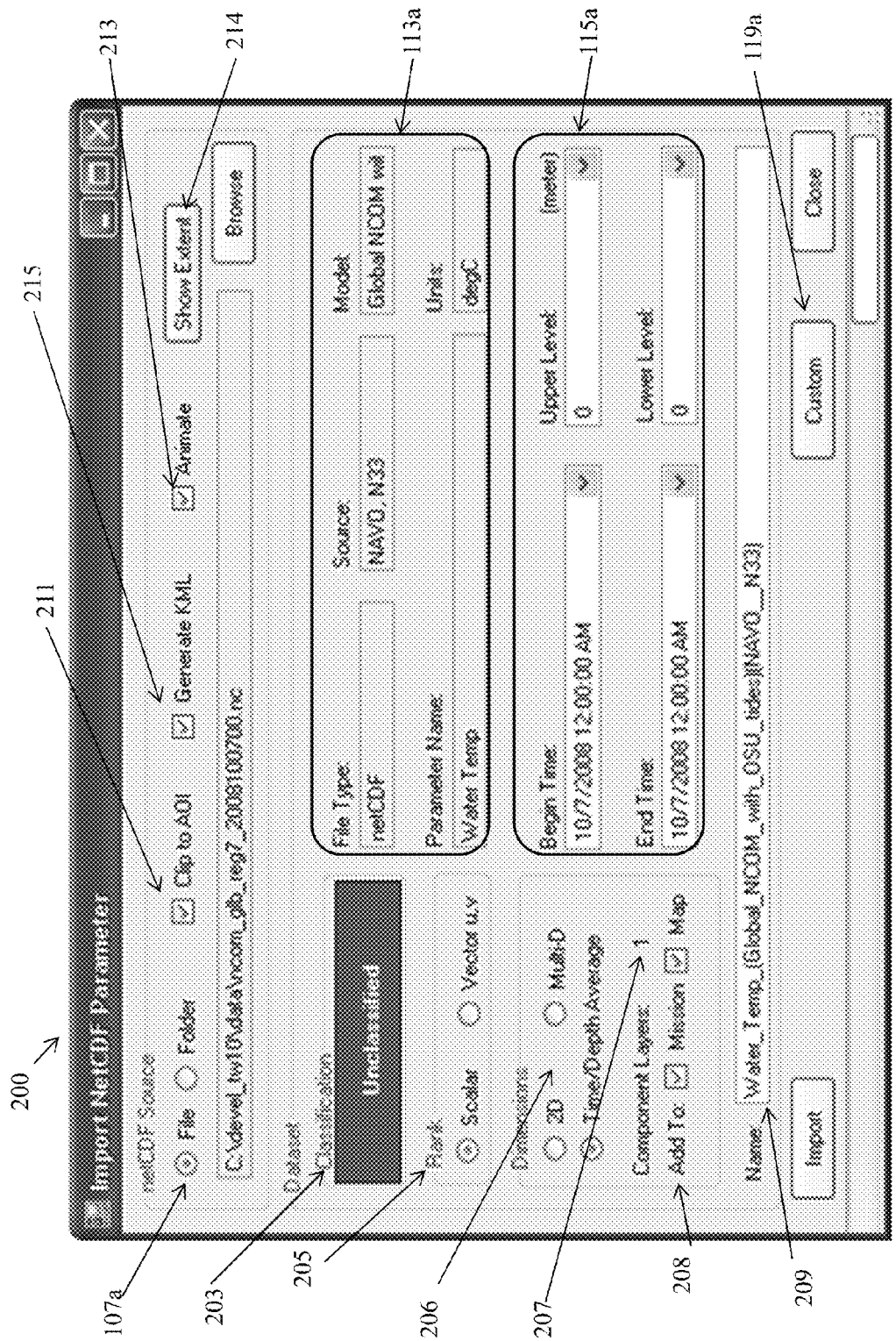
FIG. 5 is a computer screen shot of an exemplary GUI of the present embodiment.

Referring now primarily to FIG. 5, the present embodiment can include graphical user interface (GUI) 200 (FIG. 1) that can provide a multi-function approach to accessing datasets stored in the NetCDF format. The present embodiment can overcome existing limitations by handling more than one file structure and internal format of NetCDF files. Once the user indicates the file structure and selects the dataset of interest, the present embodiment can automatically detect the internal format and can extract the metadata 113 (FIG. 3A) and data ranges 115 (FIG. 3A) within the file(s) 107 (FIG. 3A). This can allow verification of the contents of the file 107 (FIG. 3A) prior to processing and storage of the extracted data 319 (FIG. 3B). In order to customize the import of the dataset, the user can be presented with options for defining a subset of the data to be loaded. Once the limits have been received, for example, but not limited to, selected by a user, additional options can enable several types of custom processing as the data are extracted from the files 107 (FIG. 3A), loaded into memory and prepared for display. From GUI 200, file selector choice 107*a*, classification level 203, scalar/vector choice 205, number of selected layers 207, default layer name 209, clip subset choice 211, animation choice 213, KML generation choice 215, metadata selector 113*a*, data range selector 115*a*, and customization info selector 119*a* can be selected, for example, but not limited to, by a user. These inputs can also be automatically provided.

Figure 6:
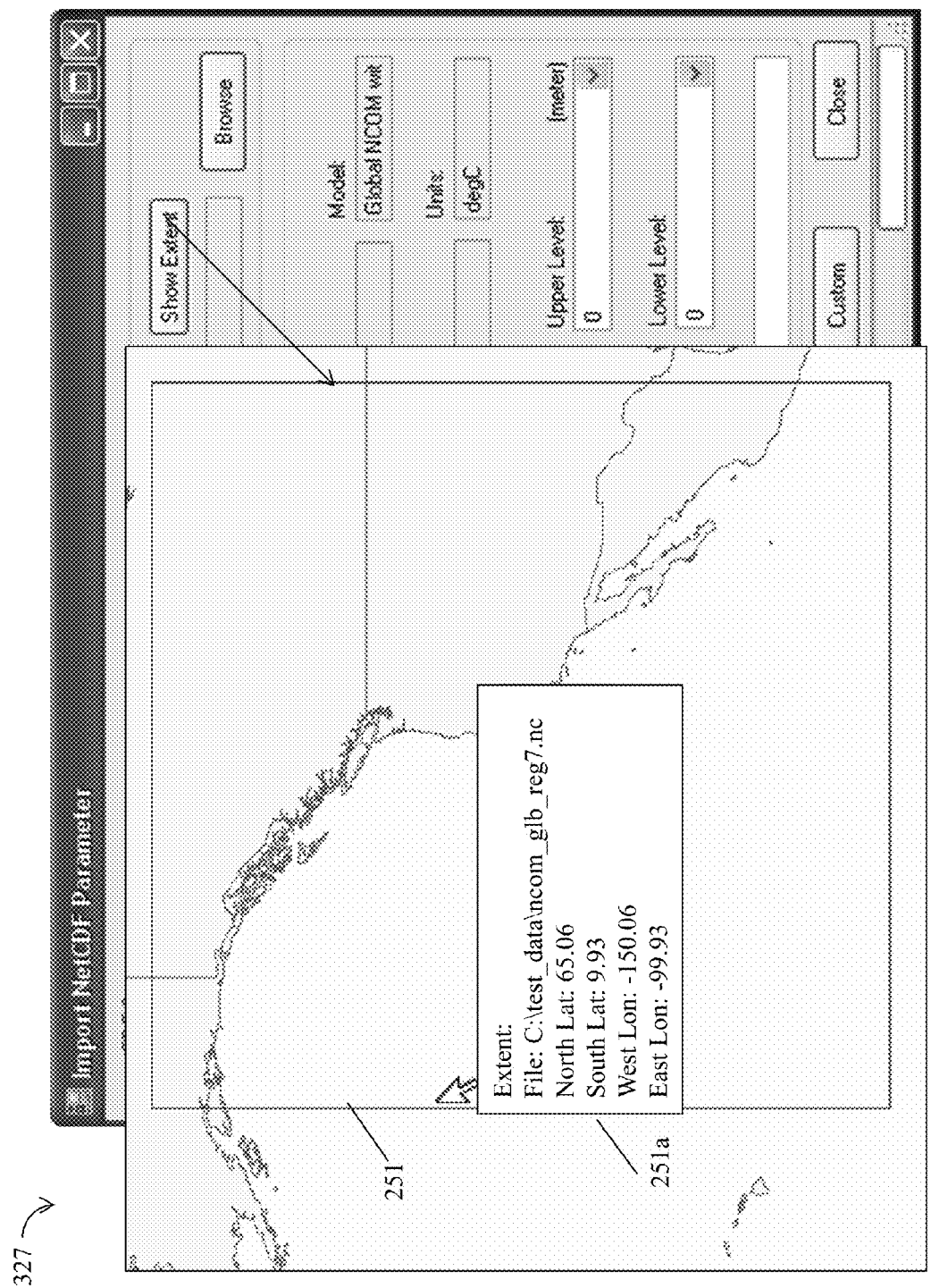
FIG. 6 is a computer screen shot of an outline of the extent of the dataset.

Referring now to FIG. 6, a display of outline 251 of the extent 251*a* of the dataset on the map 327 can be provided, for example, for a visual location verification.

Figure 7:
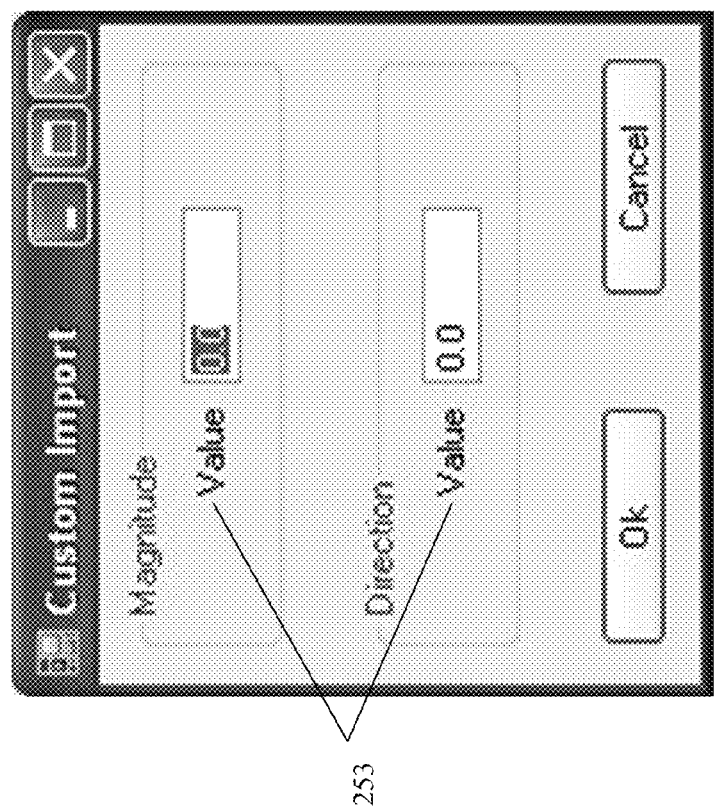
FIG. 7 is a computer screen shot of static value modification selection.

Referring now to FIG. 7, static value 253 can be added or subtracted across the board for a magnitude and/or direction (if vector-based) for a database import.

Figure 8:
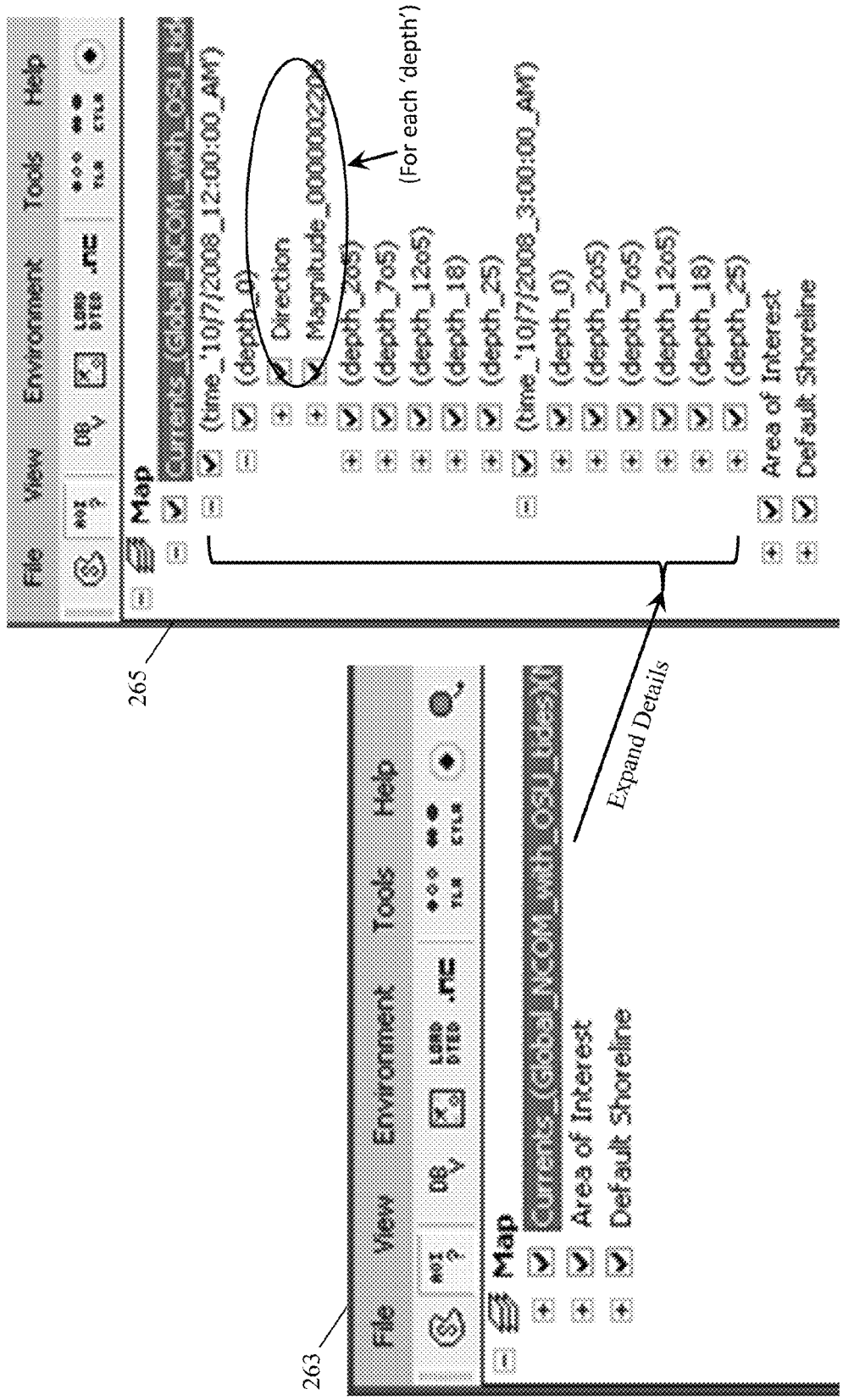
FIG. 8 is a computer screen shot of a dataset table of contents display.

Referring now primarily to FIG. 8, mapping manager 127*b* (FIG. 3B) can include a set of object classes that can manage the preparation and display of data to the table of contents and can create the map display 327 (FIG. 3B). TOC processor 325 (FIG. 1) can organize extracted data 319 (FIG. 1) for easy access, as shown. Raster and feature generation for dataset display can be included, and a table of contents hierarchy based on root level 263 can provide linkage to organized time versus depth 265 map data.

Figure 9:
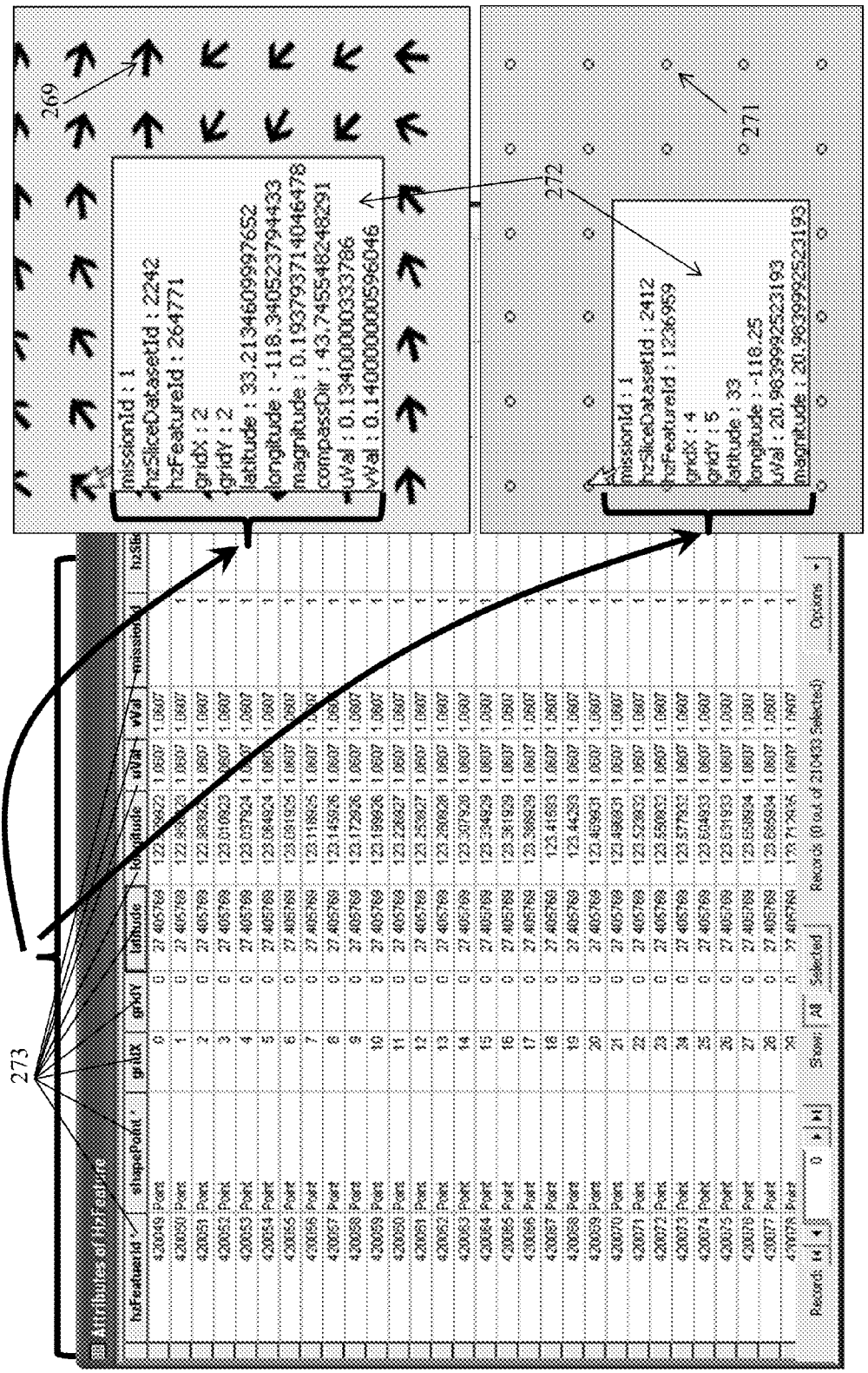
FIG. 9 is a computer screen shot of a custom layer display.

Referring now primarily to FIG. 9, a custom layer display that includes magnitude (scalar data 271) and an additional direction indication for vector data 269 can be output by scalar/vector processor 321 (FIG. 1) to the geospatial environment 329 (FIG. 1). In addition, the present embodiment overcomes the geospatial environment 329 (FIG. 1) limitation of displaying one attribute per maptip 272, which are displayed when the mouse hovers over a map feature within the geospatial environment 329 (FIG. 1), to being able to display as much attribute information as needed as shown 272. As previously mentioned, ESRI only allows associating one attribute within the maptip 272. The present embodiment allows displaying one or more of the attribute information through the use of an extra attribute which is assigned to the maptip 272 and by programmatically adding text and formatting chosen from one or more of the other attributes 273.

Computer system 100 (FIG. 3A) input 301 (FIG. 3A) can be bound to geospatial environment 329 (FIG. 3A) such as an ESRI GIS application. Input 301 can be, for example, a GUI having a user interface to customize input, process input, and output options. Input 301 (FIG. 3A) can enable processing of NetCDF files 107 (FIG. 3A) that contain multiple time slices per file for a given of the NetCDF datasets 108 (FIG. 3A)

selected as by the screen in, for example, FIG. 5, processing of NetCDF folders that contain a single NetCDF file 107 (FIG. 3A) for each time slice for the given dataset, processing of standard numerical model forecast files, such as, for example, but not limited to, NAVOCEANO NCOM files as can be selected by the screen in, for example, FIG. 5, processing of a NRL-modified NAVOCEANO NCOM format for additional environmental datasets, processing both scalar and vector based datasets as can be selected by the screen in, for example, FIG. 5, processing of 2D to 4D datasets as can be selected by the screen in, for example, FIG. 5, and metadata review of the selected dataset for verification prior to processing when, for example classification, file type, and time period choices are selected by the screen in, for example, FIG. 5. Verification can be directed to, for example, but not limited to, security classification, file internal format type, data source, forecast model (for NCOM), parameter (dataset) name, and measurement units. Input 301 (FIG. 3A) can also display an outline 251 (FIG. 6) of the extent 251a (FIG. 6) of the dataset on the map 327 (FIG. 6) for a visual location verification, as can be selected by the screen in FIG. 5. Input 301 (FIG. 3A) can also limit the subset based on latitude and longitude for a defined area of interest, limit to subset by selecting date and time range within the dataset, limit the subset by selecting a depth/level range within dataset, provide a default layer name based on metadata, add or subtract a static value across the board for magnitude and or direction (if vector based) for entire the dataset import, provide an indication of how much data is currently selected to be processed, perform subsetting and processing simultaneously as data are imported, choose to preview the results and optionally to also store the results for later viewing and analysis so reprocessing is not required, (all as shown in FIG. 5) and output a custom layer display that includes magnitude and an additional direction indication for vector data as chosen by a selection made on the screen shown in FIG. 7. Input 301 (FIG. 3A) can optionally output a time depth average 129 (FIG. 3A) for subset range selected using the screen in FIG. 5, output the imported layer as modified by the custom calculation settings made using the screen in FIG. 5, output custom Keyhole Markup Language (KML) files 131 (FIG. 3A) for display in, for example, but not limited to, GOOGLE® Earth as selected in the screen in FIG. 5, output an organized table of contents (TOC) 330 (FIG. 3A) for navigating the dataset while viewing within the GIS map display (see FIG. 6), and output the imported base data into the geodatabase 130 (FIG. 3A) for later viewing and analysis as selected by the screen in FIG. 5.

The present embodiment can further include a custom geospatial/relational database schema which is configured within geodatabase 130 (FIG. 3A) that can store processing results from extractor 109 (FIG. 3A) and verification processor 111 (FIG. 3A), subset/customization processor 123 (FIG. 3A), and time depth average processor 126 (FIG. 3A) through the use of the storage processor 127 (FIG. 3A). What gets stored is based on input 301 (FIG. 3A) options selected through, for example, a screen such as in FIG. 5, such as, for example, but not limited to, original subset metadata, original subset data layers, custom calculation results, time depth average calculations, and tool tip metadata. The custom geospatial/relational database schema can be configured in the geodatabase 130 (FIG. 3A) so that the storage processor 127 (FIG. 3A) can store hierarchy information for loading data into organized TOC tree structure, and can allow custom animation within the geospatial environment 329 (FIG. 3A). The geospatial/relational database schema can allow reloading previously processed data to save processing time from the geodatabase 130 (FIG. 3A).

Storage processor 127 (FIG. 3B) can also include a database manager 127a (FIG. 3A) having an API Object Library including, for example, but not limited to, a set of object classes that allow the storage processor 127 (FIG. 3B) to manage the geospatial database 130 (FIG. 3B) that can support dataset metadata 113 (FIG. 3A), geospatial/relational data, and data hierarchy information within the geospatial database 130 (FIG. 3B). Further, storage processor 127 (FIG. 3B) can include a map manager 127b (FIG. 3B) having an API Object Library that can include a set of object classes that can allow the storage processor 127 (FIG. 3B) through electronic communications 341 (FIG. 3B) to manage the preparation and display of data to the table of contents 330 (FIG. 3A) and GIS Map 327 (FIG. 3B) display within the geospatial environment 329 (FIG. 3A). Geospatial environment 329 (FIG. 3A) can include rasters and features, generated by subset/customization processor 123 (FIG. 3A) and time depth average processor 126 (FIG. 3A), for dataset display and creation of table of contents 330 (FIG. 3A) hierarchy and linkage between table of contents 330 (FIG. 3A) and map data 327 (FIG. 3B) display (see FIG. 8), and handling of metadata 113 (FIG. 3A) to support custom tool tips 272 (FIG. 9) from the TOC manager 127c (FIG. 3B) and storage processor 127 (FIG. 3A).

Raw data and results from the computations of the systems and methods present embodiments can be stored for future retrieval and processing, printed, displayed, transferred to another computer, and/or transferred elsewhere. Input 301 (FIG. 3A), through electronic communications 341 (FIG. 3A) can provide file structure 103 (FIG. 3A) through which formatted customized subsetted data 131 (FIG. 3A) can be transmitted. Electronic communications 341 (FIG. 3A) can be wired or wireless, for example, using cellular communication systems, military communications systems, and satellite communications systems. Any software required to implement the system can be written in a variety of conventional programming languages. Systems 100 (FIG. 3A) and 300 (FIG. 1), including any possible software, firmware, and hardware, can operate on a computer having a variable number of CPUs. Other alternative computer platforms can be used. The operating system can be, for example, but is not limited to, WINDOWS® or LINUX®.

Referring again primarily to FIGS. 2 and 4, methods 350 (FIG. 2) and 150 (FIG. 4) can be, in whole or in part, implemented electronically. Signals representing actions taken by elements of systems 300 (FIG. 1) and 100 (FIG. 3A) and other disclosed embodiments can travel over at least one live communications network 341 (FIG. 3A). Control and data information can be electronically executed and stored on at least one computer-readable medium such as, for example, formatted customized subsetted data 131 (FIG. 3A). System 100 (FIG. 3A) can be implemented to execute on at least one computer node 342 (FIG. 3A) in at least one live communications network 341 (FIG. 3A). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A computer-based method stored on a computer-readable medium, executing on a special purpose computer, for populating a map in a geospatial environment from Network Common Data Form (NetCDF) data comprising:
    automatically determining, by the special purpose computer, characteristics of the NetCDF data;
    automatically displaying, by the special purpose computer, the characteristics for interactive modification of the characteristics;
    automatically distinguishing, by the special purpose computer, the NetCDF data that are scalar values from the NetCDF data that are vector values;
    automatically creating, by the special purpose computer, an index map in computer memory;
    automatically extracting, by the special purpose computer, a subset of the NetCDF data based on the modified characteristics and the index map, the subset being extracted in three or four dimensions, depending on whether the NetCDF data are scalar values or vector values, respectively;
    automatically populating, by the special purpose computer, the map in the geospatial environment with the extracted subset; and
    automatically manipulating, by the special purpose computer, a table of contents in the geospatial environment to reference the extracted subset directly.

2. The method as in claim 1 wherein the NetCDF data comprises a plurality of files.

3. The method as in claim 1 further comprising:
    automatically determining the extent of the NetCDF data; and
    automatically determining the resolution of the NetCDF data.

4. The method as in claim 1 further comprising:
    automatically performing time-depth averaging on the extracted subset.

5. The method as in claim 1 further comprising:
    automatically exporting the extracted subset to a Keyhole Markup Language (KML) format.

6. The method as in claim 1 wherein the four dimensions comprise u and v components of the vector values, depth, and time.

7. The method as in claim 6 further comprising:
    requesting from the geospatial environment the u and v components associated with each of the depths at each of the times; and
    calculating a magnitude and a direction of the vector values based on the u and v components.

8. The method as in claim 1 further comprising:
    automatically creating two-dimensional arrays; and
    automatically computing time-depth averages over the extracted subset, storing intermediate values of the time-depth averages in the two-dimensional arrays.

9. The method as in claim 1 wherein the step of manipulating comprises:
    identifying the extracted subset as a string representative of a hierarchy; and
    storing the string in the table of contents according to the hierarchy.

10. A computer-based system executing from a computer-readable medium on a special purpose computer for populating a map in a geospatial environment from Network Common Data Form (NetCDF) data comprising:
    a characteristics processor, executing on the special purpose computer, automatically determining characteristics of the NetCDF data;
    a display processor, executing on the special purpose computer, automatically displaying the characteristics for interactive modification of the characteristics;
    a scalar and vector processor, executing on the special purpose computer, automatically distinguishing the NetCDF data that are scalar values from the NetCDF data that are vector values;
    an index map processor, executing on the special purpose computer, automatically creating an index map in computer memory;
    a data extractor, executing on the special purpose computer, automatically extracting a subset of the NetCDF data based on the modified characteristics and the index map, the subset being extracted in three or four dimensions, depending on whether the NetCDF data are scalar values or vector values, respectively, the data extractor automatically providing the extracted subset to the geospatial environment to create the map; and
    a table-of-contents processor, executing on the special purpose computer, automatically manipulating a table of contents in the geospatial environment to reference the extracted subset directly.

11. The system as in claim 10 wherein the characteristics processor automatically determines the extent of the NetCDF data, automatically determines the resolution of the NetCDF data, automatically performs time-depth averaging on the extracted subset, and automatically exports the extracted subset to a Keyhole Markup Language (KML) format.

12. The system as in claim 10 wherein the data extractor requests from the geospatial environment the u and v components associated with each of the depths at each of the times, and calculates a magnitude and a direction of the vector values based on the u and v components.

13. The system as in claim 10 wherein the data extractor automatically creates two-dimensional arrays, and automatically computes time-depth averages over the extracted subset, storing intermediate values of the time-depth averages in the two-dimensional arrays.

14. The system as in claim 10 wherein the table-of-contents processor identifies the extracted subset as a string representative of a hierarchy, and stores the string in the table of contents according to the hierarchy.

15. A computer system for accessing Network Common Data Form (NetCDF) formatted datasets and importing the datasets into a geospatial map comprising:
    a format processor receiving a file structure and an identifier for the NetCDF-formatted dataset, the format processor automatically detecting an internal format of a file from the NetCDF-formatted dataset identified by the identifier, the identifier based on a file structure;
    a metadata and data range extractor automatically extracting metadata and data ranges from the file based on the internal format;
    a verification processor automatically enabling verification of NetCDF data in the file based on the metadata, the data ranges, and verification information, the verification processor producing verified data;
    a subset and customization processor receiving subset information and customization information, the subset and customization processor simultaneously automatically extracting the NetCDF data from the file based on the subset information and the customization information, the subset and customization processor calculating subsetted and customized data in layers;

a time depth average processor automatically calculating a time depth average for the layers in the extracted NetCDF data; and a storage processor automatically storing formatted subsetted and customized data in the geospatial map, the storage processor automatically storing the time depth average in Keyhole Markup Language (KML) files on a computer-readable medium.

16. The system as in claim 15 wherein format processor comprises computer code stored on a computer readable medium for:

automatically detecting if the file includes multiple time slices or a single time slice;

automatically detecting if the file includes scalar or vector data;

automatically detecting dimensionality of the NetCDF data; and automatically detecting a security classification of the NetCDF data.

17. The system as in claim 15 wherein the storage processor comprises computer code stored on a computer readable medium executing:

automatically displaying an outline of the extent of the dataset on the map; and automatically creating and storing on the computer-readable medium an electronic table of contents for electronic navigation of the NetCDF dataset.

18. The system as in claim 15 wherein the metadata and data range extractor processor comprises computer code stored on a computer readable medium executing:

automatically overriding, based on the metadata, an Environmental Systems Research Institute (ESRI) limitation to a single attribute for mouse-over tooltip generation.

19. A computer-based method executing on a special purpose computer for accessing Network Common Data Form (NetCDF) formatted datasets and importing the datasets into a geospatial map comprising:

(a) receiving into the special purpose computer a file structure and an identifier for the NetCDF-formatted dataset;

(b) automatically detecting, by the special purpose computer, an internal format of a file from the NetCDF-formatted dataset identified by the identifier, the identifier being based on the file structure;

(c) automatically extracting, by the special purpose computer, metadata and data ranges from the file based on the internal format;

(d) automatically enabling, by the special purpose computer, verification of NetCDF data in the file based on the metadata and the data ranges;

(e) receiving into the special purpose computer subset information and customization information and simultaneously automatically extracting the NetCDF data from the file based on the subset information and the customization information;

(f) automatically calculating, by the special purpose computer, a time depth average for all layers in the extracted NetCDF data; and (g) automatically storing, by the special purpose computer, the extracted NetCDF data and the average in Keyhole Markup Language (KML) files on a computer-readable medium;

(h) repeating, by the special purpose computer, steps (e)-(g) if there are extracted NetCDF data to process; and (i) importing, by the special purpose computer, the time depth average into the geospatial map.

20. The method as in claim 19 further comprising:

automatically detecting if the file includes multiple time slices or a single time slice;

automatically detecting if the file includes scalar or vector data;

automatically detecting dimensionality of the NetCDF data;

automatically detecting a security classification of the NetCDF data;

automatically displaying an outline of the extent of the dataset on the map;

automatically creating and storing on the computer-readable medium an electronic table of contents for electronic navigation of the NetCDF dataset;

automatically storing on the computer-readable medium the extracted NetCDF data in an electronic geodatabase;

automatically overriding, based on the metadata, an Environmental Systems Research Institute (ESRI) limitation to a single attribute for mouse-over tooltip generation;

automatically organizing the extracted data to support custom animation on the map;

enabling automatic modification of the extracted data; and storing on the computer-readable medium a geospatial and relational database schema and database manager API to manage the metadata, the layers, and the time depth average.

* * * * *